United States Patent
Boutaleb et al.

(10) Patent No.: US 11,466,625 B2
(45) Date of Patent: Oct. 11, 2022

(54) METHOD FOR CONTROLLING THE SUPPLY OF FUEL TO A COMBUSTION CHAMBER OF A TURBINE ENGINE, FUEL SUPPLY SYSTEM AND TURBINE ENGINE

(71) Applicant: SAFRAN AIRCRAFT ENGINES, Paris (FR)

(72) Inventors: Mohammed-Lamine Boutaleb, Moissy-Cramayel (FR); Sebastien Christophe Chalaud, Moissy-Cramayel (FR); Gwenole Yann Le Pache, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 275 days.

(21) Appl. No.: 16/957,648

(22) PCT Filed: Dec. 21, 2018

(86) PCT No.: PCT/FR2018/053507
§ 371 (c)(1),
(2) Date: Jun. 24, 2020

(87) PCT Pub. No.: WO2019/129976
PCT Pub. Date: Jul. 4, 2019

(65) Prior Publication Data
US 2021/0062731 A1    Mar. 4, 2021

(30) Foreign Application Priority Data
Dec. 28, 2017 (FR) .................................... 1763306

(51) Int. Cl.
*F02C 9/28* (2006.01)
*F02C 7/228* (2006.01)
*F23R 3/34* (2006.01)

(52) U.S. Cl.
CPC ................ *F02C 9/28* (2013.01); *F02C 7/228* (2013.01); *F23R 3/343* (2013.01); *F05D 2270/301* (2013.01); *F05D 2270/306* (2013.01)

(58) Field of Classification Search
CPC .. F02C 7/228; F02C 9/26; F23R 3/343; F23R 3/346
See application file for complete search history.

(56) References Cited

U.S. PATENT DOCUMENTS 5,465,570 A  11/1995  Szillat et al.
5,598,698 A  2/1997  Szillat et al.
(Continued)

FOREIGN PATENT DOCUMENTS

FR    3 025 590 A1    3/2016

OTHER PUBLICATIONS

International Search Report dated May 31, 2019 in PCT/FR2018/053507 filed Dec. 21, 2018, 2 pages.
(Continued)

*Primary Examiner* — Scott J Walthour
(74) *Attorney, Agent, or Firm* — Oblon, McClelland, Maier & Neustadt, L.L.P.

(57) ABSTRACT

A method for controlling the fuel injection of a turbine engine using a fuel supply circuit. The supply circuit includes a pilot injection line and a main injection line. During a transition of the supply distribution between the pilot injection line and the main supply line, the method includes the following steps: a) determining at least a minimum value to be maintained for a pressure value; b) determining at least one hydraulic quantity of the supply circuit; c) based on the determined hydraulic quantity of the supply circuit, calculating a calculated fuel supply distribution value corresponding to the minimum value to be
(Continued)

maintained; and switching the fuel supply distribution to the calculated fuel distribution value.

12 Claims, 4 Drawing Sheets

(56) References Cited

U.S. PATENT DOCUMENTS

| | | |
|---|---|---|
| 5,916,126 A | 6/1999 | Szillat et al. |
| 2015/0027100 A1 | 1/2015 | Qin et al. |
| 2018/0372321 A1* | 12/2018 | Yates ............... F23R 3/283 |

OTHER PUBLICATIONS

French Preliminary Search Report dated Jul. 25, 2018 in Patent Application No. 1763306 filed Dec. 28, 2017, 1 page.
U.S. Appl. No. 16/015,435, filed Jun. 22, 2018, US 2018-0372006 A1, Chalaud, et al.

\* cited by examiner

METHOD FOR CONTROLLING THE SUPPLY OF FUEL TO A COMBUSTION CHAMBER OF A TURBINE ENGINE, FUEL SUPPLY SYSTEM AND TURBINE ENGINE

TECHNICAL FIELD

The invention is directed to the field of turbomachines and supply circuit of such a turbomachine.

The invention thus relates to a method for controlling fuel supply of a combustion chamber of a turbomachine, a supply circuit and a turbomachine.

STATE OF PRIOR ART

Generally, a combustion chamber of a turbomachine is supplied with fuel by injection devices designed to spray fuel into the combustion chamber. These same injection devices, forming an injection system of the combustion chamber, are supplied by a fuel supply circuit of the turbomachine.

Injection devices have at least one first and a second part configured to allow supply to the combustion chamber according to a respective supply type. The first part thus corresponds to a pilot supply type dedicated to low speed and the second part corresponds to a main supply type dedicated to high speed and for optimising chamber combustion at these high speeds so as to reduce the pollution generated. These first and second parts can:

either each consist of injection devices dedicated to the corresponding supply type, or each consist of a part of each injection device which is dedicated to the corresponding supply type.

Irrespective of the configuration of these injection devices, the fuel supply distribution of each of the first and the second parts is provided by the fuel supply circuit.

Thus, for this the supply circuit includes a pilot injection line and a main injection line between which the fuel supply of the combustion chamber is distributed, the pilot injection line supplying the first part of the injection devices and the main injection line supplying the second part of the injection devices with fuel. Fuel supply of the injection chamber is thus distributed between the pilot injection line and the main injection line.

In order to limit the pollution generated by turbomachines, fuel supply distribution of the pilot and main injection lines is, for different operating phases of the turbomachine, whether in flight or on the ground, particularly regulated.

Regarding the changes in fuel supply distribution of the pilot and main injection lines, between its different operating phases, regulations are less strict and only require that this switch occurs during a predetermined period of time.

In order to exemplify such a switch, it has been provided in FIGS. 1A to 1C an example of fuel supply transition upon accelerating the turbomachine switching it from low speed to high speed. As shown in FIG. 1B, in this example, the supply distribution switches from a 100% first distribution value of fuel supply on the pilot injection line, the main injection line being substantially not supplied with fuel, to a 5% second distribution value of fuel supply on the injection line, the main injection line being supplied with 95% of the fuel.

Thus, in accordance with the teachings of document FR 3025590 A1 and as illustrated in FIGS. 1A to 1C, it is known to make such switching abruptly.

It can thus be seen in these figures that, during such a speed change 501 (R in FIG. 1A), the fuel injection flow rate 502 (Db in FIG. 1A) is gradually increased until it reaches, at the same time as speed 501, a maximum. Switching 511 the distribution 510 (Ds in FIG. 1B) from the first value to the second value is performed abruptly when the speed reaches its maximum. As shown in FIG. 1C, this distribution 510 switching from the first value to the second value results itself in a sharp drop 521 in the pressure 520 (P in FIG. 1C) in the fuel supply circuit.

Such a pressure drop is due to the fact that, for a same flow rate, head losses are more significant for the first part of the injection devices than for the second part of the injection devices. Thus as a result, switching from the first value to the second value of fuel supply distribution leads to a significant reduction in head losses generated by the relevant injection line, and therefore a decrease, at an equal fuel flow rate, in the pressure of the fuel supply circuit.

However, such a pressure drop can be particularly detrimental to the operation of the turbomachine when it occurs during some operating phases of the turbomachine, such as the acceleration phase illustrated in FIGS. 1A to 1C, or phases of ingestion of external elements, such as a bird, rain water/snow and hail. These different phases require keeping pressure in the supply circuit.

Indeed, in a turbomachine, high pressure of the fuel supply circuit is also used to supply hydraulic cylinders, controlling movable members useful for engine operability, for example, variable angle stator vanes or bleed valves of a compressor. A pressure drop in the fuel supply circuit has therefore a direct consequence on the hydraulic muscle supplying these cylinders and therefore on the capability to actuate movable members, whereas the loads being applied to the movable members can be increasing. It is therefore necessary, in order to enable the turbomachine to properly operate, to provide increased dimensioning of hydraulic cylinders supplied by the fuel circuit of the turbomachine, in order to be able to provide sufficient loads with however less hydraulic muscle due to the pressure drop related to the change in fuel supply distribution.

Thus, methods for controlling fuel supply currently implemented are not adapted with respect to fuel distribution change phases since they can result in a pressure drop in the fuel supply circuit of the turbomachine. This pressure drop, in order not to be detrimental to the operation of the turbomachine, may require an increased dimensioning of hydraulic cylinders, especially an increase in their diameter.

DISCLOSURE OF THE INVENTION

The invention aims at solving this drawback and thus its purpose is to provide a method for controlling fuel supply of a turbomachine for ensuring an adequate pressure of the fuel supply circuit during a change in fuel distribution without requiring an increased dimensioning of hydraulic cylinders, as is the case for turbomachines of prior art.

The invention relates to a method for controlling fuel injection in a combustion chamber of a turbomachine, the turbomachine comprising a fuel supply circuit of an injection system of the combustion chamber, said supply circuit comprising a pilot injection line and a main injection line between which the fuel supply of the combustion chamber is distributed, controlling method in which, a transition of the supply distribution between the pilot injection line and the main injection line from a first distribution value to a second distribution value is performed over a corresponding period of time, the supply distribution having the second distribution value at the end of the corresponding period of time, the controlling method comprises, for a transition of the supply distribution from a first distribution value to a second distribution value for which fuel distribution from the pilot injection line is reduced relative to that of this same pilot injection line for the first distribution value, the following steps of:

a) determining at least one minimum value to be maintained of a pressure quantity of the supply circuit for at least one part of the period of time, b) determining at least one hydraulic quantity of the supply circuit, c) calculating, from the determined hydraulic quantity of the supply circuit, a calculated distribution value of fuel supply corresponding to the minimum value to be maintained of the pressure quantity, the distribution value calculated being chosen from a range of values defined between the first distribution value and the second distribution value, said range of values including the first and second distribution values, d) switching the fuel supply distribution to the distribution value calculated, at least steps b) to d) being successively repeated for the whole duration of the corresponding period of time.

With such a method, switching from the first to the second value during the corresponding period of time, that is the predetermined period of time during which switching from the first to the second value has to occur, is made so as to keep minimum pressure in the supply circuit. With such a pressure kept, actuating the cylinders is provided without necessarily having an increased dimensioning of cylinders as is the case in methods of prior art.

During step c) of calculating, from the determined hydraulic quantity of the supply circuit, a calculated distribution value of fuel supply corresponding to the minimum value to be maintained of the pressure quantity, the calculated distribution value can be intermediate between the first distribution value and the second distribution value.

It will be noted that the minimum value to be maintained of a pressure quantity of the supply circuit for at least one part of the period of time can be a minimum pressure value necessary to actuate at least one part of the hydraulic actuators of the turbomachine.

Step c) of calculating the calculated distribution value of fuel supply may include the following sub-steps of:

calculating from the determined hydraulic quantity of the supply circuit and from a current value of the pressure quantity of the supply circuit, a current value of the pressure quantity of the supply circuit comparing the calculated current value of the pressure quantity of the supply circuit with the determined minimum value to be maintained of the pressure quantity of the supply circuit, calculating, from the comparison result, the calculated distribution value of fuel supply corresponding to the minimum value to be maintained.

Step c) of calculating the calculated distribution value of fuel supply can consist of a step of calculating said calculated distribution value of fuel supply from the at least one determined hydraulic quantity of the fuel supply circuit and from the determined minimum value to be maintained of the pressure quantity of the supply circuit.

This way, with these two alternatives of step c), it is possible to obtain a quick change in the supply distribution while ensuring that the pressure in the supply circuit remains sufficient to guarantee proper operation of the hydraulic cylinders.

The pressure quantity can be chosen from a pressure value of the supply circuit and a value of force developed by a cylinder supplied by the supply circuit, and the hydraulic quantity of the supply circuit is a value of the fuel supply flow rate of the injection chamber.

Upon successively repeating steps b) to d), step a) can also be repeated, this being for determining a minimum value to be maintained of the pressure quantity of the fuel supply circuit for a fraction of period of the corresponding period of time.

In this way, the supply system is able to provide proper actuation for the whole corresponding period of time irrespective of upgrades of the turbomachine configuration.

The invention further relates to a fuel supply circuit for a turbomachine, the fuel circuit including:

a pilot injection line for supplying a pilot part of an injection system of a combustion chamber of the turbomachine, a main injection line for supplying a main part of the injection system of the combustion chamber, a fuel supply distributing device configured to control fuel distribution between the pilot injection line and the main injection line, a control unit able to control the supply distributing device and to make a measurement of some hydraulic quantities of the supply circuit, the control unit being configured to control the distributing system so as to provide transition of the supply distribution between the pilot injection line and the main injection line from a first distribution value to a second distribution value over a corresponding period of time, the supply distribution having the second distribution value at the end of the corresponding period of time.

The control unit is further configured to, upon controlling the fuel distributing system to perform a transition of supply distribution from a first distribution value to a second distribution value for which the fuel distribution of the pilot injection line is reduced relative to that of this same pilot injection line for the first distribution value, implement the following steps of:

a) determining at least one minimum value to be maintained of a pressure quantity of the supply circuit for at least one part of the corresponding period of time, b) determining at least one hydraulic quantity of the supply circuit, c) calculating, from the determined hydraulic quantity of the supply circuit, a calculated distribution value of fuel supply corresponding to the minimum value to be maintained of the pressure quantity, the calculated distribution value being chosen from a range of values defined between the first distribution value and the second distribution value, said range of values including the first and second distribution values, d) switching the supply distribution to the calculated supply distribution value, the control unit being further configured to successively repeat steps b) to d) for the whole duration of the corresponding period of time.

Such a supply circuit allows implementation of a supply method according to the invention thus benefiting from advantages related thereto.

The control unit can further be configured so that, during step c) of calculating, from the determined hydraulic quantity of the supply circuit, a calculated distribution value of fuel supply corresponding to the minimum value to be maintained of the pressure quantity, the calculated distribution value is intermediate between the first distribution value and the second distribution value.

The control unit can include:

a minimum pressure determining module configured to determine a minimum value to be maintained of the pressure quantity of the supply circuit for at least one part of the corresponding period of time, a calculation module configured to calculate from a determined hydraulic quantity of the supply circuit and from a current value of the fuel supply distribution, a current value of the pressure quantity of the supply circuit, a comparison module configured to compare the calculated current value of the pressure quantity of the supply circuit with the determined minimum value to be maintained of the pressure quantity of the supply circuit, and to calculate, from the comparison result, a calculated distribution value of fuel supply corresponding to the determined minimum value to be maintained of the pressure quantity of the supply circuit.

The control unit is a turbomachine calculator.

The invention relates to a turbomachine comprising an injection chamber, said injection chamber comprising an injection system, said turbomachine further comprising a fuel supply circuit according to the invention supplying the injection system with fuel.

Such a turbomachine benefits from advantages related to the fuel supply circuit it includes.

BRIEF DESCRIPTION OF THE DRAWINGS

The present invention will be better understood upon reading the description of exemplary embodiments, given by way of purely indicative and in no way limiting purposes, made with reference to the appended drawings in which.

Identical, similar or equivalent parts of the different figures bear the same reference numerals so as to facilitate switching from one figure to another.

Different parts represented in the figures are not necessarily drawn to a uniform scale, to make the figures more legible.

Different possibilities (alternatives and embodiments) should be understood as being not mutually exclusive and combinable with each other.

DETAILED DISCLOSURE OF PARTICUAR EMBODIMENTS

Figure 1A:
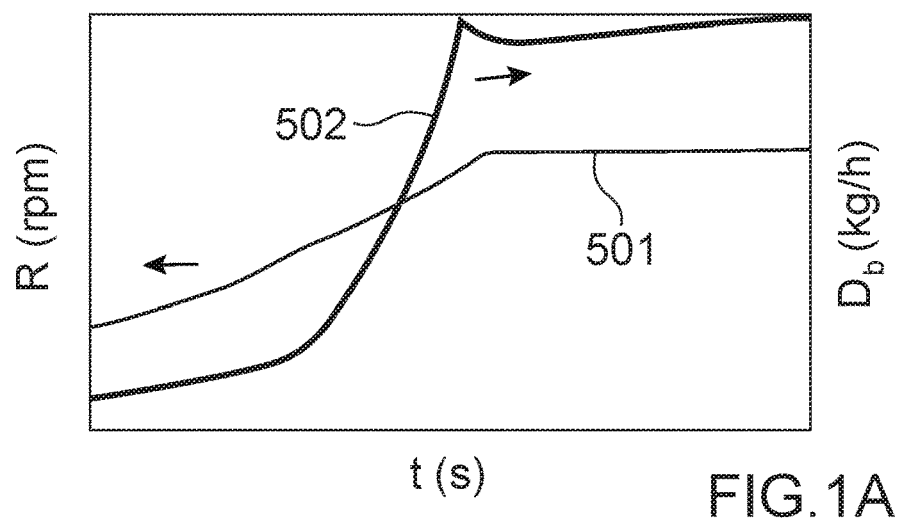
FIGS. 1A to 1C graphically illustrate the variation in some parameters of a turbomachine and supply circuit of prior art equipping said turbomachine when said turbomachine switches from low speed to high speed, FIG. 1A depicting the variation over time in the turbomachine speed and the flow rate of fuel injected into the combustion chamber, FIG. 1B depicting the variation over time in fuel supply distribution between a pilot supply line and a main supply line.
Figure 1B:
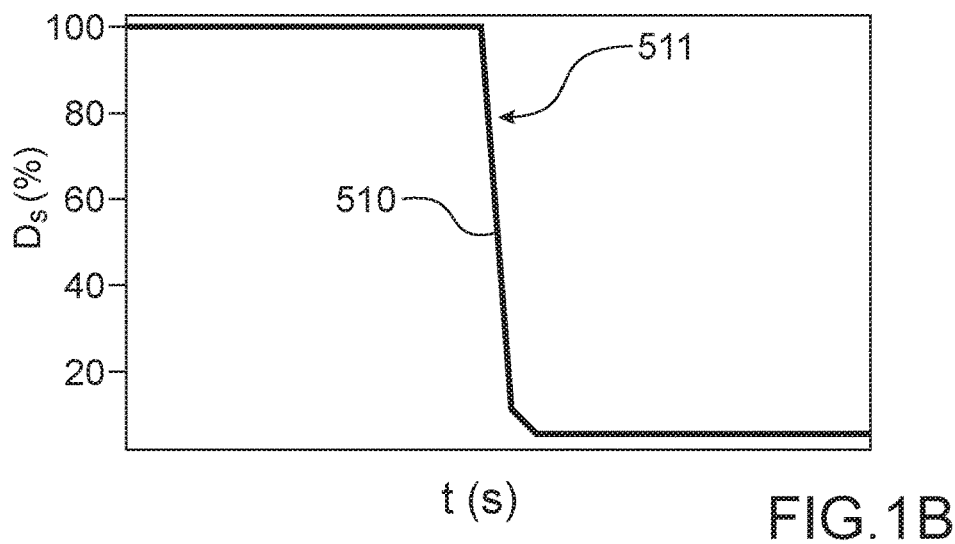
Figure 1C:
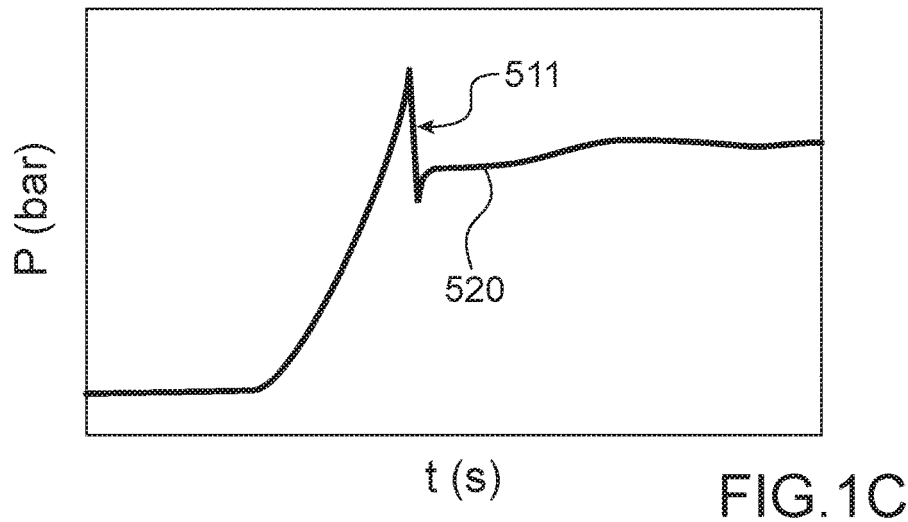
Figure 2:
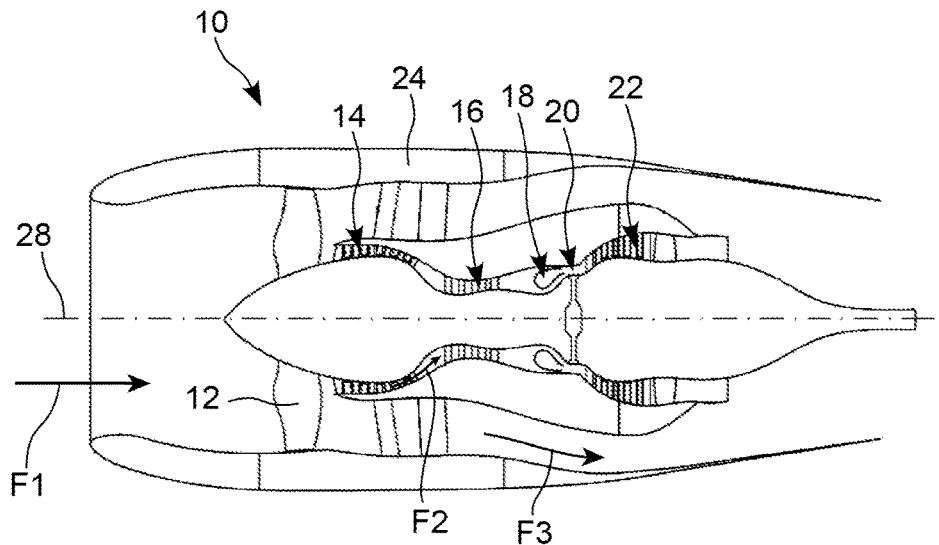
FIG. 2 is an axial cross-section schematic view of a turbomachine for an aircraft according to a first embodiment of the invention.

FIG. 2 illustrates a turbomachine, for example a turbofan engine 10 for an aircraft, generally including a fan 12 arranged to suck an airflow F1 being divided downstream of the fan into a primary flow F2 supplying a core of the turbofan and a secondary flow F3 bypassing this core and for providing theoretically most of the thrust.

The turbofan core includes, in a well known manner, a low pressure compressor 14, a high pressure compressor 16, a combustion chamber 18 for example of the annular type, a high pressure turbine 20 and a low pressure turbine 22. The turbofan is shrouded by a nacelle 24 surrounding the flowing space 26 of the secondary flow. The turbofan rotors are rotatably mounted about a longitudinal axis 28 of the turbofan.

The invention is however applicable to any turbomachine type.

Figure 3:
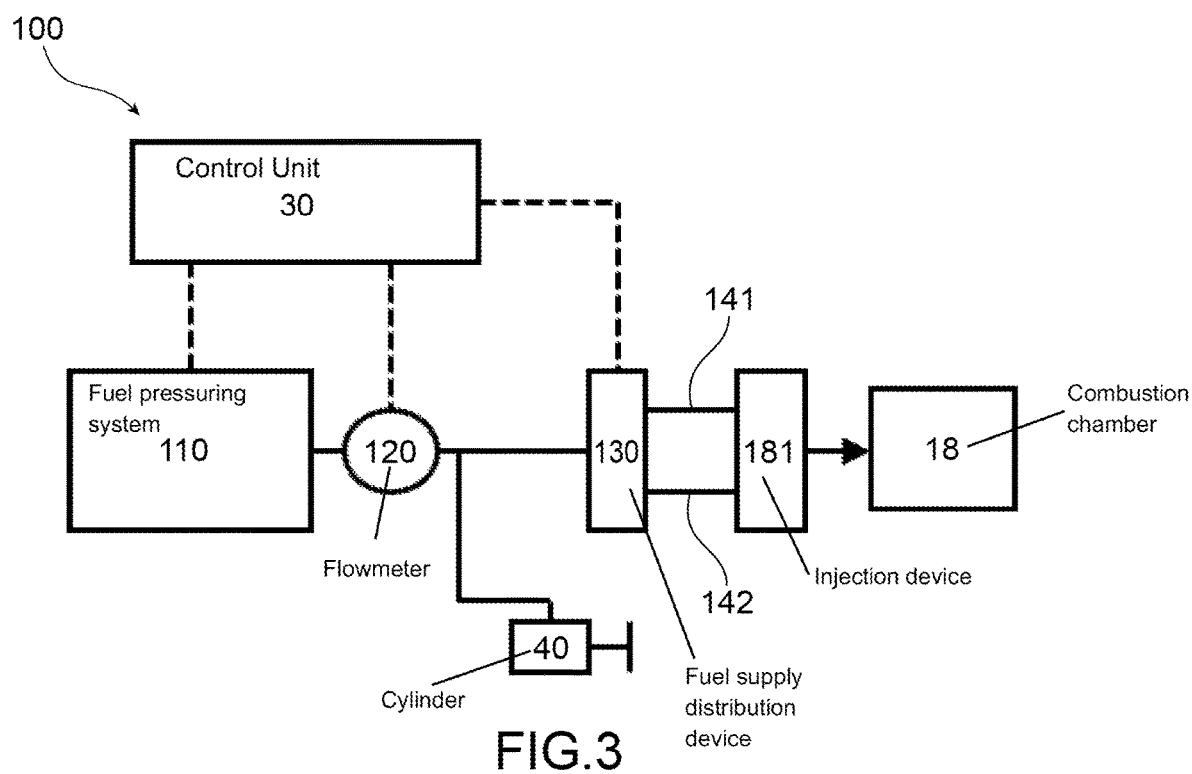
FIG. 3 is a schematic view of elements making up a fuel supply circuit of a turbomachine according to the first embodiment.

The combustion chamber 18 is supplied with fuel by a fuel supply circuit 100 schematically illustrated in FIG. 3 and fuel injection devices 181, generally called injectors. Each of the injection devices comprises a fuel exhaust duct, not illustrated, able to spray fuel into the combustion chamber, for example through corresponding holes, not illustrated, provided in a bottom wall of the combustion chamber. To that end, the fuel exhaust ducts directly or indirectly open into the combustion chamber 18.

As described in connection with prior art, these injection devices 181 have at least one first and one second part, not represented, configured to allow supply of the combustion chamber 18 according to a respective supply type. The first part thus corresponds to a pilot supply type dedicated to low speed and the second part corresponds to a main supply type dedicated to high speed and adapted to optimise the combustion speed of the chamber at these high speeds so as to reduce the pollution generated. These first and second parts can:

either each consist of injection devices 181 dedicated to the corresponding supply type, or, according to a preferential possibility of the invention, each consist of a part of each injection device 181 which is dedicated to the corresponding supply type.

According to the latter possibility, each injection device 181 can, for example, include two types of holes supplied by a corresponding exhaust duct:

a central hole of a relatively significant dimension forming, with the corresponding exhaust duct, the first part of said injection device 181, holes peripheral to the central hole and distributed about this same central hole, these peripheral holes forming with the corresponding exhaust duct the second part of said injection device 181.

Irrespective of the configuration of these injection devices 181, the fuel supply distribution of each of the first and the second parts is provided by the fuel supply circuit 100.

The fuel supply circuit 100 comprises, as shown in FIG. 3:

a fuel pressurising system 110 able to supply with fuel the fuel supply circuit 100 from fuel supplied by the aircraft fitted with the turbomachine, and to control the actuation of cylinders 40 of the turbomachine, a flowmeter 120 adapted to measure the flow rate of fuel passing in the fuel supply circuit 100, the flow rate forming a hydraulic quantity of the supply circuit 100, a fuel supply distribution device 130 configured to control fuel distribution to the first and second parts of the injection devices 181, a pilot injection line 141 configured to supply with fuel the first part of the injection devices 181, a main injection line 142 configured to supply with fuel the second part of the injection devices 181, a control unit 30 able to control the distribution device 130 and to make a measurement of some hydraulic quantities of the supply circuit 100, especially the fuel flow rate in the supply circuit 100 from the flowmeter 120.

Thus, in accordance with the present embodiment, the hydraulic quantity of the supply circuit 100 can be the fuel flow rate in the supply circuit upstream of the supply distribution device 130. According to this possibility, this hydraulic quantity of the supply circuit 100 can be the flow rate at the pipe supplying the cylinders 40. Such a value enables a proper estimation of hydraulic muscle of said cylinders 40 to be obtained.

Of course, the control unit 30 can also be able to control the distribution device 130 and to make a measurement of a hydraulic quantity other than the fuel flow speed, for example the fuel pressure in the supply circuit 100 using a pressure gauge. Alternatively, the measured hydraulic quantity can consist of the fuel distribution between the pilot injection line and the main injection line. For example, if the distribution device is formed by a valve provided with a movable cover as a sliding spool the position of which governs distribution, measuring fuel distribution can be made by measuring the position of the spool. According to another possibility of the invention, this measurement of distribution can be performed using two flowmeters respectively disposed in the pilot injection line 141 and main injection line 142.

The pilot injection line 141 is configured to supply with fuel the first part of injection devices 181 and the main injection line 142 is configured to supply with fuel the second part of injection devices 181. It will also be noted that the supply distribution device 130 is configured to control fuel distribution between the pilot injection line 141 and main injection line 142.

According to an advantageous configuration of the invention, the control unit 30 is formed by a calculator of the turbomachine. As an alternative, the control unit 30 can be formed by an electronics solely dedicated to the control of the supply circuit 100.

In the rest of this document, for the purpose of simplicity, a transition of the supply distribution between the pilot injection line 141 and the main injection line 142 from a first distribution value to a second distribution value for which the supply distribution of the pilot injection line 141 in the second value is reduced relative to that of this same pilot injection line 141 for the first distribution value, is referred to as "reduction transition of pilot distribution".

Figure 4:
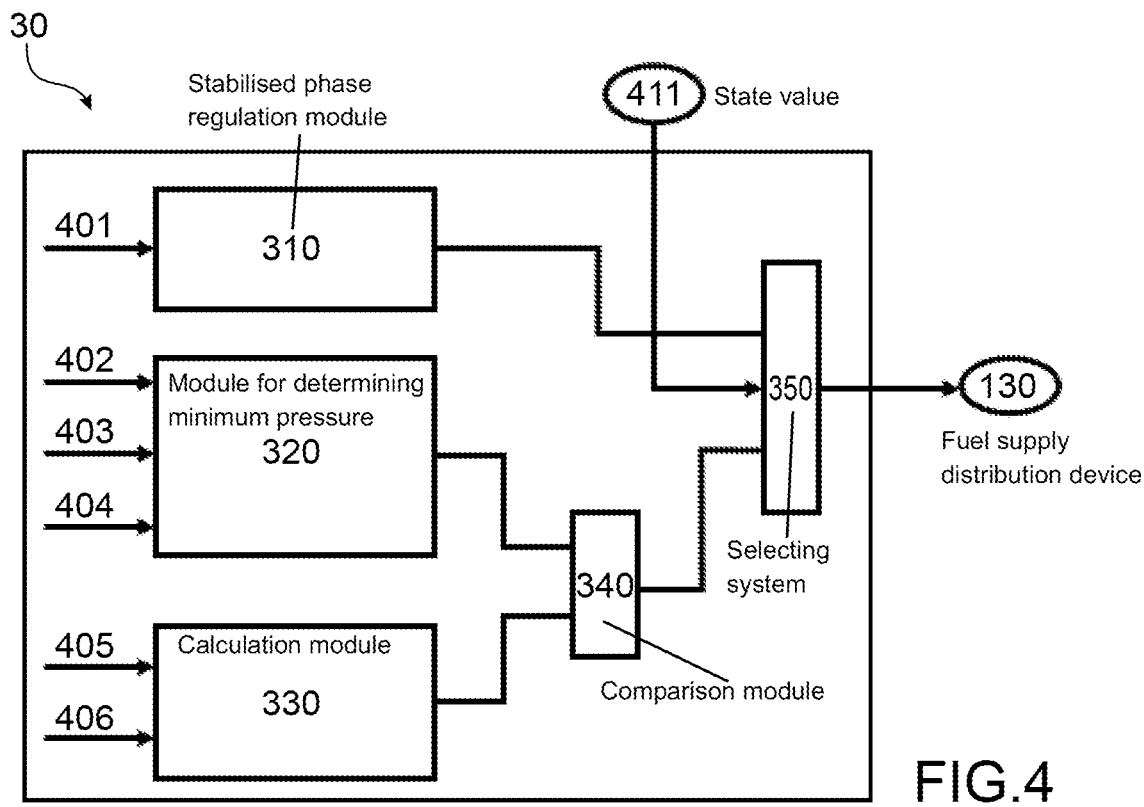
FIG. 4 is a block diagram of a control unit according to the first embodiment of the invention.
Figure 5:
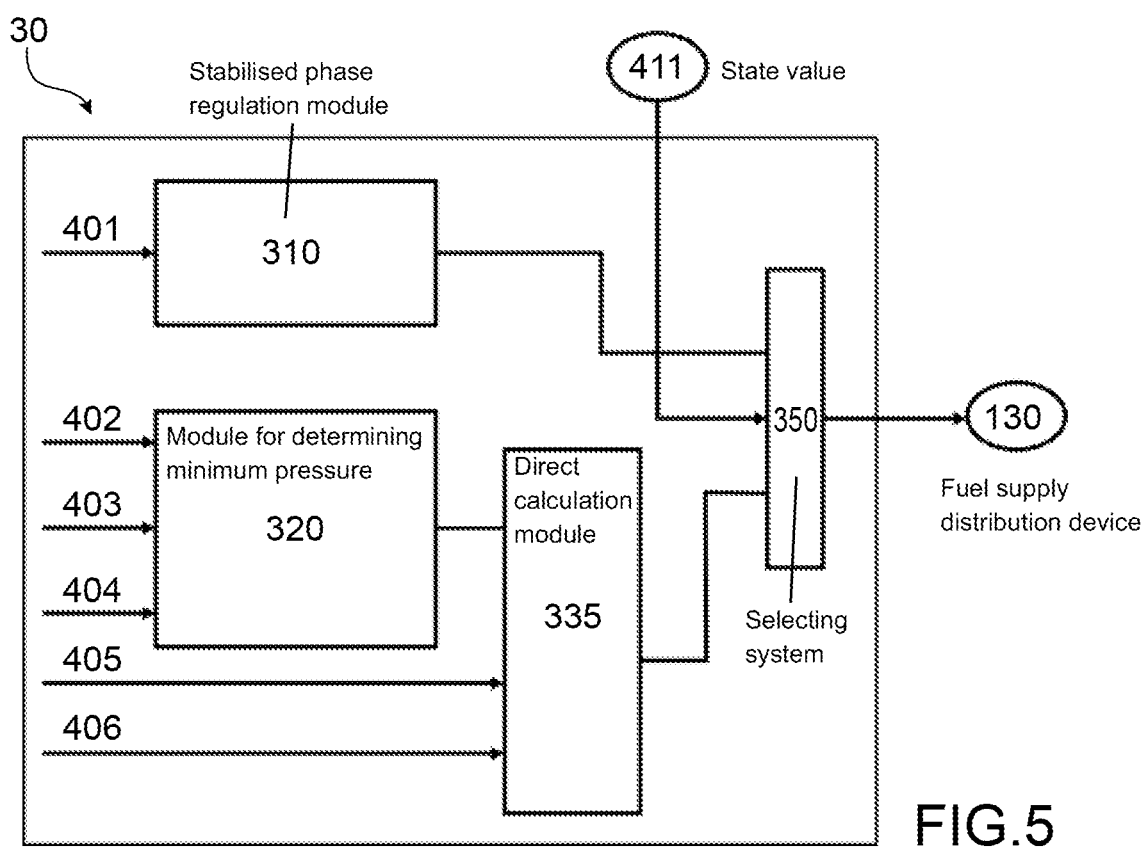
FIG. 5 is a block diagram of a control unit according to a second embodiment.

FIG. 4 illustrates a block diagram of the control unit 30. Thus the control unit 30 includes:

a stabilised phase regulation module 310 adapted to control different elements of the fuel supply circuit 100 apart from the reduction transition phases of pilot distribution, this stabilised phase regulation module 310 being configured to provide control of the fuel supply distribution between the pilot injection line 141 and the main injection line 142 which is similar to control modules of prior art, a module 320 for determining the minimum pressure to be maintained of a pressure quantity of the fuel supply circuit, such as the pressure of the supply circuit 100, during a reduction transition phase of the pilot distribution from a configuration of the turbomachine, said configuration especially including speed state information of the turbomachine 402, position information 403 for the cylinders 40 and control information 404 for moving the cylinders 40, said minimum pressure to be maintained forming a minimum value to be maintained, a calculation module 330 configured to calculate from the hydraulic quantity of the supply circuit 100 and from a current value of the fuel supply distribution, a current value of the pressure quantity of the supply circuit 100, a comparison module 340 configured to compare the determined value of the pressure quantity of the supply circuit 100 and the calculated current value of the pressure quantity of the supply circuit 100 and to calculate, from the comparison result, a calculated distribution value of fuel supply corresponding to the minimum value to be maintained, a selecting system 350 configured to, from at least one state value 411 of the turbomachine characteristic of a reduction transition of distribution, select a control value of the supply distribution from that provided by the stabilised phase regulation module 310 and the value calculated by the comparison module 340.

Each of the modules 310, 320, 330, 340 is provided either by a dedicated circuit of the control unit 30, or by a software module set up on said control unit 30.

According to a possibility of the invention, the pressure quantity of the supply circuit 100 can be a pressure value of the supply circuit as well as a value of force developed by a cylinder 40 supplied by the supply circuit 100.

It will be noted that the state value 411 is a characteristic quantity of a state corresponding to a reduction transition of pilot distribution. According to a conventional configuration, the state value can take a value 1 (or 0) for the whole duration of the reduction transition of pilot distribution and a value 0 (or 1) outside the same. According to another possibility, this state value 411 can include a plurality of states corresponding to states of the turbomachine 18 for which a reduction transition of the pilot distribution is made, and at least one state for which the turbomachine 18 is outside a reduction transition of the pilot distribution.

Regarding the minimum pressure determining module 320, this determination can be performed depending on the state of the turbomachine and empirically, the values of the pressure quantity having then being experimentally determined during prior factory experiments. As an alternative, this determination can be made:

from factory simulations for defining laws regarding the values of minimum pressure quantity during a reduction transition of the pilot distribution, from values considered as being secure values, the latter being overestimated so as to ensure a control of cylinders irrespective of stresses applied to cylinders.

The calculation module 330 is configured to calculate the current value of the pressure quantity of the supply circuit 100, for example, based on a model for continuously determining the pressure level from the fuel flow rate and from a value of supply distribution between the pilot injection line 141 and the main injection line 142.

With such a configuration, the control unit 30 is configured to control the supply distribution system 130 so as to provide a transition of the supply distribution between the pilot injection line 141 and the main injection line 142 from a first distribution value to a second distribution value over a corresponding period of time, the supply distribution having the second distribution value at the end of the corresponding period of time.

Moreover, the control unit 30 is configured, during a reduction transition of the pilot distribution, to implement the following steps of:

a) determining at least one minimum value to be maintained of the pressure quantity of the supply circuit 100 for at least one part of the corresponding period of time tt, b) determining at least one hydraulic quantity of the supply circuit 100, said hydraulic quantity being, for example, the fuel flow rate in the supply circuit 100, c) from at least one hydraulic quantity of the supply circuit 100, determining a calculated distribution value of supply corresponding to the minimum value to be maintained of the pressure quantity, the calculated distribution value being chosen from a range of values defined between the first distribution value and the second distribution value, said range of values including the first and second distribution values, d) switching the fuel supply distribution to the calculated supply distribution value.

The control unit 30 is further configured to successively repeat steps b) to d) for the whole duration of the corresponding period of time.

In other words and according to the invention, with such a configuration of the supply circuit 100, the control unit 30 is for implementing a method for supplying fuel to a turbomachine including, during a reduction transition of the pilot distribution, the following steps of:

a) determining at least one minimum value to be maintained of a pressure quantity of the supply circuit for at least one part of the period of time, b) determining at least one hydraulic quantity of the supply circuit, c) calculating, from the determined hydraulic quantity of the supply circuit 100, a calculated distribution value of fuel supply corresponding to the minimum value to be maintained of the pressure quantity, the calculated distribution value being chosen from a range of values defined between the first distribution value and the second distribution value, said range of values including the first and second distribution values, d) switching the fuel supply distribution to the calculated distribution value, steps b) to d) being successively repeated for the whole duration of the corresponding period of time.

It will be noted that, alternatively, during step c) of calculating, from the determined hydraulic quantity of the supply circuit 100, a calculated distribution value of fuel supply corresponding to the minimum value to be maintained, the calculated distribution value can be intermediate between the first distribution value and the second distribution value.

It will also be noted that the minimum value to be maintained of a pressure quantity of the supply circuit can be a minimum pressure value necessary to actuate at least one part of the hydraulic actuators of the turbomachine, that is cylinders 40.

According to this first embodiment, step c) of determining a calculated distribution value of fuel supply includes the following sub-steps of:

calculating an actual value of the pressure quantity of the supply circuit from the determined hydraulic quantity of the supply circuit and from an actual distribution value of fuel supply, comparing the calculated current value of the pressure quantity of the supply circuit with the determined minimum value to be maintained of the pressure quantity of the supply circuit, calculating, from the comparison result, the calculated distribution value of fuel supply corresponding to the minimum value to be maintained.

According to one possibility of the invention, it is also contemplatable that, when successively repeating steps b) to d), step a) is also repeated. According to this possibility, step a) is for determining a minimum value to be maintained of a pressure quantity of the fuel supply circuit during a given fraction of period of the period of time.

FIG. 4 illustrates a block diagram of a control unit 30 for a fuel supply circuit 100 according to a second embodiment of the invention. A fuel supply circuit 100 according to this second embodiment differs from a fuel supply circuit 100 according to the first embodiment in that the control unit has, instead of the calculation module 330 and the comparison module, a direct calculation module 335.

The direct calculation module 335 is configured to calculate a calculated distribution value of fuel supply from the at least one determined hydraulic quantity of the supply circuit and from the determined minimum value to be maintained of a pressure quantity of the supply circuit.

According to this second embodiment, the selecting system 350 is configured to, from the at least one state value 411 of the turbomachine characteristic of a reduction transition of distribution, select a control value of the supply distribution from that provided by the stabilised phase regulation module 310 and the value calculated by the direct calculation module 335.

Calculating the calculated distribution value of fuel supply distribution can be performed based on an equation directly or indirectly derived from equation (1).

Thus, according to this second embodiment, the method for controlling fuel supply differs from a method for controlling fuel supply according to the first embodiment in that step c) of determining a calculated distribution value of fuel supply consists of: a step of calculating said calculated distribution value of fuel supply from the at least one determined hydraulic quantity of the fuel supply circuit and from the determined minimum value to be maintained of a pressure quantity of the supply circuit.

Figure 6A:
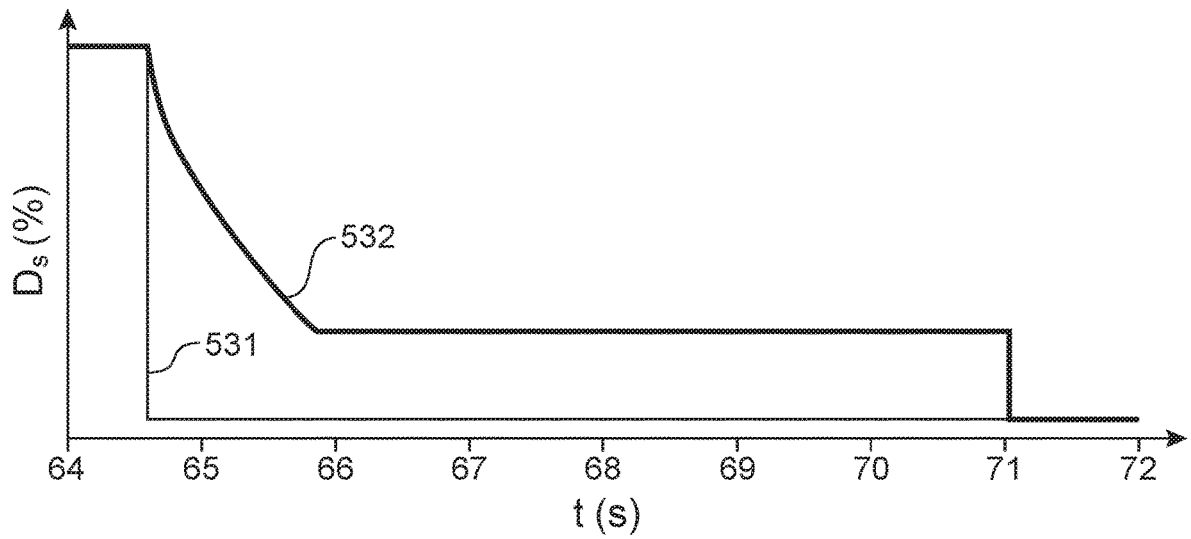
FIGS. 6A and 6B illustrate a comparison between a transition in fuel distribution according to prior art and a transition in fuel distribution according to the invention with respectively, in FIG. 6A, the variation over time in fuel supply distribution and, in FIG. 6B, in the pressure of the fuel supply circuit.
Figure 6B:
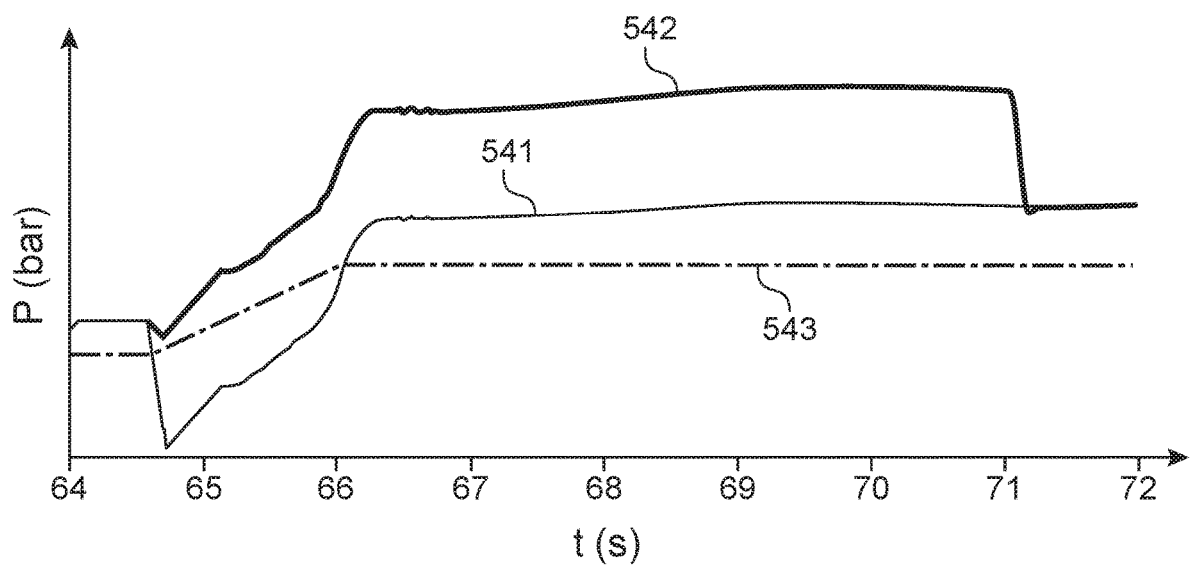

Whether the fuel supply circuit 100 is according to the first embodiment or the second embodiment, such a supply circuit 100 is for providing, during a reduction transition of the pilot distribution and as illustrated in FIGS. 6A and 6B, a pressure in the fuel supply circuit compatible with pressure requirements for moving the cylinders 40.

Indeed, FIGS. 6A and 6B illustrate such a comparison with, in FIG. 6A, the variation over time in the distribution of fuel supply 531, 532 and, in FIG. 6B, in the pressure 541, 542 of the supply circuit 100. FIG. 6B also shows, in dotted lines, the result of determining the minimum necessary pressure value 543 of the supply circuit 100 during the reduction transition of the pilot distribution.

It will be noted that such a necessary minimum value 543 can be different from the minimum value to be maintained according to the invention since, according to the invention, the minimum value to be maintained can correspond to the minimum necessary value to which a stored pressure is added.

It can be seen in FIG. 6B, that with such a method of prior art in which the transition of fuel supply between the pilot injection line 141 and the main injection line 142 is abrupt, as that illustrated in FIG. 6A, this transition results in a sharp drop in pressure in the supply circuit 100 and this becomes lower than the minimum pressure value necessary. Movements of cylinders 40 are therefore partially included therein. After this sharp drop in pressure, the increase in the fuel flow rate in the supply circuit 100 leads to a pressure increase and, after a relatively significant period of time, enables the minimum value necessary to be reached. Movements of cylinders 40s. However, it can be seen that with the method of prior art, pressure in the supply circuit 100 remains lower than the minimum necessary pressure value during a relatively significant period of time.

Within the scope of the invention, due to be implementation of the method according to the invention, it can be seen that the drop in the supply distribution has a drop in the supply of the pilot line which is gradual, which is for maintaining the pressure value to the minimum pressure value to be maintained. This gradual drop is directly related to the increase in the fuel flow rate in the supply circuit 100. Thus, once the fuel flow rate is stabilised, the supply distribution 532 is also stabilised by implementing the method. It will be noted that, according to the principle of the invention, at the end of the period of time tt, the supply distribution 532 is brought back to the second value.

It will be noted that if such a method is particularly advantageous in the case of a reduction transition of the pilot distribution related to an acceleration in the turbomachine 10, that is during switching from low speed to high speed, it is also advantageous during other operating phases of the turbomachine. In particular, the following cases will be mentioned:

ingestion of external elements, such as a bird, run water/snow and hail, the turbomachine supply switching during such an ingestion to a so-called "rich" mixture speed, during a rotating stall.

Thus, the supply circuit according to the invention and the related method is for providing, irrespective of the phase of the turbomachine 10 requiring a reduction transition of the pilot distribution, the pressure necessary to cylinders 40 in order to ensure the responsivity necessary in controlling the movement of these cylinders 40.

The invention claimed is:

1. A method for controlling fuel injection into a combustion chamber of a turbomachine, the turbomachine comprising a fuel supply circuit for an injection system of the combustion chamber, said fuel supply circuit comprising a pilot injection line and a main injection line between which fuel supply of the combustion chamber is distributed, the method comprising:

controlling a transition of a supply distribution between the pilot injection line and the main injection line, from a first supply distribution value to a second supply distribution value, over a corresponding period of time, the supply distribution having the second supply distribution value at the end of the corresponding period of time, wherein the second supply distribution value provides a reduced flow of fuel to the pilot injection line relative to the first supply distribution value, wherein controlling the transition of the supply distribution comprises the following steps of:

a) determining at least one minimum value to be maintained of a pressure quantity of the fuel supply circuit for at least one part of the corresponding period of time, b) determining at least one hydraulic quantity of the fuel supply circuit, c) calculating, from the at least one hydraulic quantity of the fuel supply circuit, a calculated distribution value of fuel supply corresponding to the at least one minimum value to be maintained of the pressure quantity, the calculated distribution value being within a range of values between the first supply distribution value and the second supply distribution value, said range of values including the first and second supply distribution values, d) switching the supply distribution to the calculated distribution value, and successively repeating at least steps b) through d) for the entire duration of the corresponding period of time, wherein the at least one minimum value to be maintained of the pressure quantity of the fuel supply circuit during the at least one part of the corresponding period of time comprises a minimum pressure value necessary to actuate at least one hydraulic actuator of the turbomachine.

2. The method according to claim 1, wherein the calculated distribution value is intermediate between the first supply distribution value and the second supply distribution value.

3. The method according to claim 1, wherein step c) of calculating the calculated distribution value of fuel supply comprises the following sub-steps of:

calculating from both the determined at least one hydraulic quantity of the fuel supply circuit and a current distribution value of fuel supply a current value of a pressure quantity of the fuel supply circuit, comparing the current value of the pressure quantity of the fuel supply circuit with the at least one minimum value to be maintained of the pressure quantity of the fuel supply circuit, calculating, based on comparing the current value of the pressure quantity of the fuel supply circuit with the at least one minimum value to be maintained of the pressure quantity of the fuel supply circuit, the calculated distribution value of fuel supply corresponding to the minimum value to be maintained.

4. The method according to claim 1, wherein step c) of calculating the calculated distribution value of fuel supply consists of calculating said calculated distribution value of fuel supply from the at least one determined hydraulic quantity of the fuel supply circuit and from the at least one minimum value to be maintained of the pressure quantity of the fuel supply circuit.

5. The method according to claim 1, wherein the pressure quantity is based on a value of force developed by a hydraulic cylinder supplied by the fuel supply circuit, and the at least one hydraulic quantity of the fuel supply circuit is a value of a fuel flow rate to the combustion chamber.

6. The method according to claim 1, wherein upon successively repeating steps b) to d), steps a) through d) are repeated to update the at least one minimum value to be maintained of the pressure quantity of the fuel supply circuit for at least a second part of the corresponding period of time.

7. A fuel circuit for supplying a turbomachine with fuel, the fuel circuit including:

a pilot injection line for supplying a pilot part of an injection system of a combustion chamber of the turbomachine, a main injection line for supplying a main part of the injection system of the combustion chamber, a fuel supply distributing device configured to distribute fuel to the pilot injection line and the main injection line, a control unit configured to control the fuel supply distributing device and to receive measurements of hydraulic quantities of the fuel circuit, the control unit being configured to control the fuel supply distributing device so as to transition a supply distribution between the pilot injection line and the main injection line, from a first supply distribution value to a second supply distribution value, over a corresponding period of time, the supply distribution having the second supply distribution value at the end of the corresponding period of time, wherein the second supply distribution value provides a reduced flow of fuel to the pilot injection line relative to the first supply distribution value, the control unit configured to:
a) determine at least one minimum value to be maintained of a pressure quantity of the fuel circuit for at least one part of the corresponding period of time,
b) determine at least one hydraulic quantity of the fuel circuit,
c) calculate, from the at least one hydraulic quantity of the fuel circuit, a calculated distribution value of fuel supply corresponding to the at least one minimum value to be maintained of the pressure quantity, the calculated distribution value being within a range of values between the first supply distribution value and the second supply distribution value, said range of values including the first and second supply distribution values,
d) switch the supply distribution to the calculated distribution value, and successively repeat steps b) through d) for the entire duration of the corresponding period of time ,
wherein the at least one minimum value to be maintained of the pressure quantity of the fuel circuit during the at least one part of the corresponding period of time comprises a minimum pressure value necessary to actuate at least one hydraulic actuator of the turbomachine.

8. The fuel circuit according to claim 7, calculated distribution value is intermediate between the first supply distribution value and the second supply distribution value.

9. The fuel circuit according to claim 7, wherein the control unit comprises:
a minimum pressure determining module configured to determine the at least one minimum value to be maintained of the pressure quantity of the supply fuel circuit for at least one part of the corresponding period of time,
a calculation module configured to calculate, from both the at least one hydraulic quantity of the fuel circuit and a current value of the supply distribution, a current value of the pressure quantity of the fuel circuit,
a comparison module configured to compare the current value of the pressure quantity of the fuel circuit with the at least one minimum value to be maintained of the pressure quantity of the fuel circuit, and to calculate, based on the comparison, a calculated distribution value of fuel supply corresponding to the at least one minimum value to be maintained of the pressure quantity of the fuel circuit.

10. The fuel circuit according to claim 7, wherein the control unit comprises:
a minimum pressure determining module configured to determine the at least one minimum value to be maintained of the pressure quantity of the fuel circuit for the at least one part of the corresponding period of time,
a direct calculation module configured to calculate a calculated distribution value of fuel supply from the at least one hydraulic quantity of the fuel circuit and from the at least one minimum value to be maintained of the pressure quantity of the fuel circuit.

11. The fuel circuit according to claim 7, wherein the control unit is a turbomachine controller.

12. A turbomachine comprising an injection chamber, said injection chamber comprising an injection system, said turbomachine further comprising the fuel circuit according to claim 7 configured to supply the injection system with fuel.

* * * * *